Patented Nov. 7, 1922.

1,434,893

UNITED STATES PATENT OFFICE.

SAKUSHIRO HATAKEYAMA, OF KOBE, JAPAN, ASSIGNOR OF ONE-HALF TO CHOJI FUNAI, OF KOBE, JAPAN.

METHOD OF MANUFACTURING MATCHES WITHOUT HEADS.

No Drawing.　　Application filed October 21, 1921.　Serial No. 509,409.

*To all whom it may concern:*

Be it known that I, SAKUSHIRO HATAKEYAMA, a subject of the Emperor of Japan, residing at 82 banyashiki, 5-chome, Miyamoto-dori, Kobe, Japan, have invented certain new and useful Improvements in a Method of Manufacturing Matches Without Heads, of which the following is a specification.

The present invention relates to a method of manufacturing matches without heads, characterized by the combination of a process of boiling the splints in presence of the aqueous solution of some chlorate salt and drying the same up, with a process of making the tips of the splints absorb the aqueous solution of barium chlorate and dextrine.

The object of the present invention is to save minor labours of match manufacture as well as to lessen the volume of matches, thereby to effect the simplification of the whole course of match manufacturing process.

To describe the new process more fully,—the first step is to boil the wooden stems or splints in presence of solution of some chlorate salt (as for instance, potassium chlorate dissolved in 12 volumes of water) and then drying the splints subsequent to their impregnation with aqueous solution of potassium chlorate, as a preparation to facilitate absorption of the ignitable solution to take place in the next step, and also to give the splints suitable combustibility; the second step is to make the ignitable solution described below soak into the splint tips as a ignitable material and then drying the splints subsequent to their impregnation with aqueous solution of potassium chlorate, and finally obtaining the required no-head matches.

The recipe for the ignitable solution is as follows:

Take the two chemicals barium chlorate 50 gr., dextrine 2 gr., and mix them up at 100° C. into a concentrated solution which is the required one. Next bundles of the splints are made and the said solution is brought by means of a rotating roll so as to immerse the lower ends of the bundles thereto; the solution is equally absorbed into all the tips and thus matches of equal quality are obtained. The tips may also be made easily discernible by suitable colouring.

Thus, in the present invention, no-head matches being manufactured by only two main processes, the method is very simple compared with the old one, and the splints being of lesser volume and so being more handy for general treatment, the cost of production may be greatly curtailed.

I claim:

A method of manufacturing matches without heads, characterized by boiling the splints with aqueous solution of potassium chlorate and after drying, making the tips of the splints absorb the aqueous solution of barium chlorate and dextrine, as and for the object hereinbefore set forth.

In testimony whereof I have affixed my signature in presence of two witnesses.

SAKUSHIRO HATAKEYAMA.

Witnesses:
 GEORGE P. WALLER,
 W. CHIHARAH.